United States Patent
Kang et al.

(10) Patent No.: US 12,214,906 B2
(45) Date of Patent: Feb. 4, 2025

(54) SUPPORT APPARATUS FOR MODAL TEST AND USING METHOD THEREOF

(71) Applicant: CHINA ACADEMY OF AEROSPACE AERODYNAMICS, Beijing (CN)

(72) Inventors: Chuanming Kang, Beijing (CN); Baihua An, Beijing (CN); Hanxing Liang, Beijing (CN); Xiewei Lin, Beijing (CN); Yiting Guo, Beijing (CN)

(73) Assignee: CHINA ACADEMY OF AEROSPACE AERODYNAMICS, Beijing (CN)

( * ) Notice: Subject to any disclaimer, the term of this patent is extended or adjusted under 35 U.S.C. 154(b) by 0 days.

(21) Appl. No.: 17/928,613

(22) PCT Filed: Jun. 28, 2022

(86) PCT No.: PCT/CN2022/101982
§ 371 (c)(1),
(2) Date: Nov. 29, 2022

(87) PCT Pub. No.: WO2023/016114
PCT Pub. Date: Feb. 16, 2023

(65) Prior Publication Data
US 2024/0217675 A1    Jul. 4, 2024

(30) Foreign Application Priority Data
Aug. 10, 2021  (CN) .......................... 202110914591.3

(51) Int. Cl.
*G01M 7/04*   (2006.01)
*B64F 5/60*   (2017.01)
*G01M 7/02*   (2006.01)

(52) U.S. Cl.
CPC ............... *B64F 5/60* (2017.01); *G01M 7/027* (2013.01); *G01M 7/04* (2013.01)

(58) Field of Classification Search
CPC ............ G01M 7/04; G01M 7/027; B64F 5/60
(Continued)

(56) References Cited

U.S. PATENT DOCUMENTS

| 6,098,969 A | * | 8/2000 | Nagarajaiah | F16F 15/04 267/136 |
| 8,408,066 B1 | * | 4/2013 | Romero | G01M 7/022 73/761 |

FOREIGN PATENT DOCUMENTS

| CN | 204666117 U | * | 9/2015 |
| CN | 207379696 U |   | 5/2018 |

(Continued)

OTHER PUBLICATIONS

Machine translation of KR 20110004003 A (Year: 2011).*
Machine translation of CN 113109007 A (Year: 2021).*
Machine translation of CN 204666117 U (Year: 2045).*

*Primary Examiner* — John E Breene
*Assistant Examiner* — Rose M Miller

(57) ABSTRACT

A support apparatus for a modal test and a using method thereof. The support apparatus includes: a suspension structure (1) configured to suspend a test unit (2); and a support structure disposed under the suspension structure (1) and configured to support the test unit (2). The suspension structure (1) and the support structure are matched to cause a stiffness of the support apparatus for a modal test to be zero. The support structure includes an anti-stiffness rhombus-shaped frame (4), a scalable sleeve, a horizontal elastic component (49), and a base (6). The scalable sleeve is connected to the anti-stiffness rhombus-shaped frame (4) and the base (6) respectively, and the horizontal elastic (Continued)

component (49) connects two diagonal points of the anti-stiffness rhombus-shaped frame (4).

9 Claims, 1 Drawing Sheet

(58) Field of Classification Search
USPC .......................................................... 73/663
See application file for complete search history.

(56) References Cited

FOREIGN PATENT DOCUMENTS

| | | | |
|---|---|---|---|
| CN | 109607382 | A | 4/2019 |
| CN | 208847464 | U | 5/2019 |
| CN | 112211952 | A | 1/2021 |
| CN | 112549890 | A | 3/2021 |
| CN | 113109007 | A * | 7/2021 |
| GB | 754408 | A | 8/1956 |
| JP | H10267786 | A | 10/1998 |
| KR | 20110004003 | A * | 1/2011 |

\* cited by examiner

SUPPORT APPARATUS FOR MODAL TEST AND USING METHOD THEREOF

FIELD OF TECHNOLOGY

The present invention relates to the mechanical field, and more specifically, to a support apparatus for a modal test and a using method thereof.

BACKGROUND

Test modal analysis, also known as the test process of modal analysis and referred to as modal test for short, is the inverse process of theoretical modal analysis. It is one of the methods to verify the reliability of finite element analysis and one of the necessary and effective means to carry out dynamic design of structure. In the modal test, it is very important to support the tested structural parts properly, because the structure will have different modal parameters under different boundary conditions. Modal test is a necessary test for large and highly flexible solar UAV, aircraft, or structural parts. However, due to the large size and large flexibility of the test unit, its natural frequency is generally very low. Conventional support tooling is difficult to meet the test requirements, and the test credibility is greatly reduced. Therefore, a support apparatus for a modal test with high credibility is urgently required.

SUMMARY

The present invention aims to provide a support apparatus for a modal test with high test credibility and a using method thereof.

To achieve the foregoing aims, the present invention provides a support apparatus for a modal test, including: a suspension structure, configured to suspend a test unit; and a support structure, disposed under the suspension structure and configured to support the test unit, the suspension structure and the support structure being matched to cause a stiffness of the support apparatus for a modal test to be zero; the support structure comprising an anti-stiffness rhombus-shaped frame, a scalable sleeve, a horizontal elastic component, and a base, the base being disposed under the anti-stiffness rhombus-shaped frame, the scalable sleeve being connected to the anti-stiffness rhombus-shaped frame and the base respectively, and the horizontal elastic component connecting two diagonal points of the anti-stiffness rhombus-shaped frame; wherein the suspension structure comprises a suspension crossbeam, a first elastic component, and a second elastic component, the first elastic component and the second elastic component are horizontally connected to the suspension crossbeam and configured to suspend the test unit, and the first elastic component and the second elastic component have the same elastic stiffness coefficient, and the elastic stiffness coefficients of the first elastic component and the second elastic component are a half of an elastic stiffness coefficient of the horizontal elastic component.

The anti-stiffness rhombus-shaped frame comprises a first rhombus-shaped frame support rod, a second rhombus-shaped frame support rod, a third rhombus-shaped frame support rod and a fourth rhombus-shaped frame support rod that are connected successively and a first hinge, a second hinge, a third hinge, and a fourth hinge, the first rhombus-shaped frame support rod and the second rhombus-shaped frame support rod are articulated via the first hinge, the second rhombus-shaped frame support rod and the third rhombus-shaped frame support rod are articulated via the second hinge, the third rhombus-shaped frame support rod and the fourth rhombus-shaped frame support rod are articulated via the third hinge, and the fourth rhombus-shaped frame support rod and the first rhombus-shaped frame support rod are articulated via the fourth hinge.

Preferably, the second hinge is located at a bottom of the anti-stiffness rhombus-shaped frame, and the fourth hinge is located at a top of the anti-stiffness rhombus-shaped frame.

Preferably, the horizontal elastic component is disposed between the first hinge and the third hinge.

Preferably, the scalable sleeve comprises a sleeve body and a slide bar disposed in the sleeve body, one end of the slide bar is connected to a bottom of the fourth hinge, and the other end of the slide bar is disposed inside the sleeve body, and the second hinge is fixedly connected to a side wall of a lower part of the sleeve body, so that the slide bar slides in the sleeve body to deform the anti-stiffness rhombus-shaped frame.

Preferably, the other end of the slide bar is connected inside the sleeve body via a linear bearing.

Preferably, a rubber head is disposed at a top of the fourth hinge, and the rubber head is connected to the test unit.

Preferably, the base comprises a support pillar and a horizontal support plate, the support pillar is disposed under the horizontal support plate, the horizontal support plate is connected to the support pillar and the sleeve body respectively, and the sleeve body passes through the horizontal support plate.

Preferably, the first rhombus-shaped frame support rod, the second rhombus-shaped frame support rod, the third rhombus-shaped frame support rod, the fourth rhombus-shaped frame support rod, and the slide bar are all made of alloy materials.

The present invention further provides a method for using the foregoing support apparatus for a modal test, including: disposing a test unit on the support structure and suspending the test unit by means of the suspension structure; adjusting, after the suspended test unit is balanced and stationary, the first rhombus-shaped frame support rod, the second rhombus-shaped frame support rod, the third rhombus-shaped frame support rod, and the fourth rhombus-shaped frame support rod, to cause the first rhombus-shaped frame support rod and the second rhombus-shaped frame support rod to overlap, to cause the third rhombus-shaped frame support rod and the fourth rhombus-shaped frame support rod to overlap, and to cause the first rhombus-shaped frame support rod and third rhombus-shaped frame support rod to be at the same horizontal level.

The beneficial effect of the present invention is that the stiffness of the support apparatus for a modal test of the present invention is low, the modal test requirements of the low-frequency structure are met, and the credibility of the test is improved, and the composition is simple, reliable, the robustness is good, and easy to operate.

The present invention has other characteristics and advantages which will be apparent or stated in detail from the drawings accompanied herein and subsequent specific embodiments which are used together to explain the specific principles of the present invention.

BRIEF DESCRIPTION OF THE DRAWINGS

The above and other purposes, characteristics and advantages of the present invention will become more apparent by using a more detailed description of the exemplary embodiments of the present invention combined with the accompanying drawings. In an exemplary embodiment of the present invention, the same accompanying drawing mark usually represents the same part.

DESCRIPTION OF REFERENCE SIGNS

Figure 1:
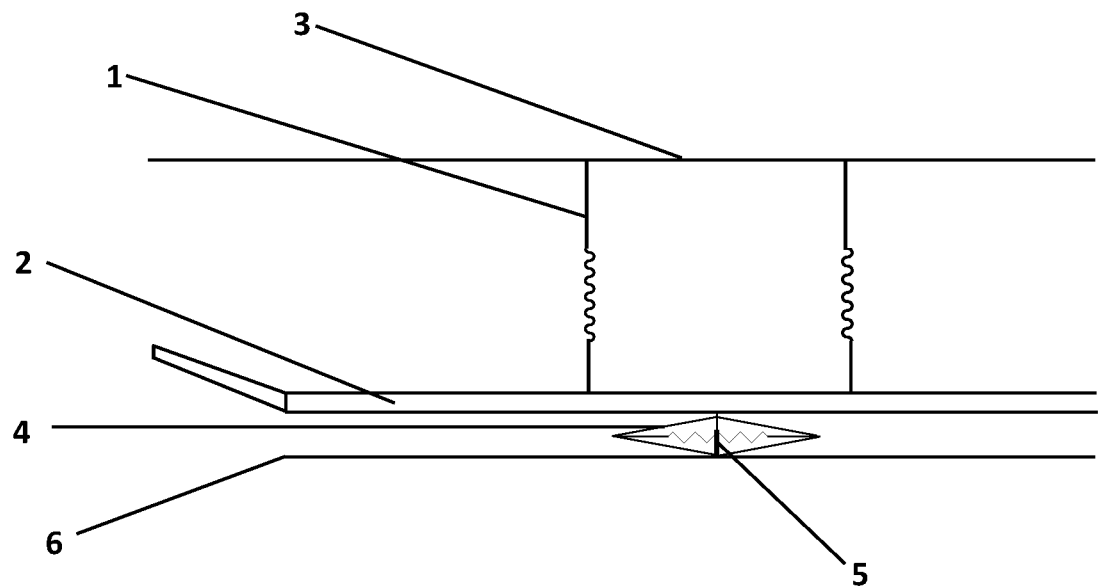
FIG. 1 is a structural diagram of a support apparatus for a modal test according to one embodiment of the present invention.

1. Suspension structure; 2. Test unit; 3. Suspension beam; 4. Anti-stiffness rhombus-shaped frame; 5. Sleeve body; 6. Base; 41. First rhombus-shaped frame support rod; 42. Second rhombus-shaped frame support rod; 43. Third rhombus-shaped frame support rod; 44. Fourth rhombus-shaped frame support rod; 45. First hinge; 46. Second hinge; 47. Third hinge; 48. Fourth hinge; 49. Horizontal elastic component; 50. Rubber head; 51. Slide bar; 52. Linear bearing; 61. Horizontal support plate; 62. Support pillar.

DESCRIPTION OF THE EMBODIMENTS

Preferred embodiments of the present invention are described in more detail below with reference to the accompanying drawings. Although preferred embodiments of the present invention are shown in the accompanying drawings, it should be understood that the present invention may be realized in various forms and should not be limited by the embodiments described here. On the contrary, these embodiments are provided in order to make the present invention more thorough and complete, and to enable the complete communication of the scope of the present invention to the person skilled in the art.

A support apparatus for a modal test according to the present invention includes: a suspension structure, configured to suspend a test unit; and a support structure, disposed under the suspension structure and configured to support the test unit, the suspension structure and the support structure being matched to cause a stiffness of the support apparatus for a modal test to be zero. The support structure includes an anti-stiffness rhombus-shaped frame, a scalable sleeve, a horizontal elastic component, and a base. The base is disposed under the anti-stiffness rhombus-shaped frame, the scalable sleeve is connected to the anti-stiffness rhombus-shaped frame and the base respectively, and the horizontal elastic component connects two diagonal points of the anti-stiffness rhombus-shaped frame. The suspension structure includes a suspension crossbeam, a first elastic component, and a second elastic component. The first elastic component and the second elastic component are horizontally connected to the suspension crossbeam and configured to suspend the test unit. The first elastic component and the second elastic component have the same elastic stiffness coefficient, and the elastic stiffness coefficients of the first elastic component and the second elastic component are a half of an elastic stiffness coefficient of the horizontal elastic component.

Specifically, a solar UAV is suspended on a suspension beam by means of a suspension structure, and the suspension structure may be an elastic element such as a rubber rope or a spring. The solar UAV is supported by using a support structure underneath, and the support structure includes an anti-stiffness rhombus-shaped frame, a scalable sleeve, a base, and a horizontal elastic component. The anti-stiffness rhombus-shaped frame is disposed on the scalable sleeve, the scalable sleeve is fixedly connected to the base, and the base is disposed under the anti-stiffness rhombus-shaped frame. The base is placed on the horizontal ground, and the horizontal elastic component is arranged on the diagonal of the anti-stiffness rhombus-shaped frame.

The suspension structure includes a first elastic component and a second elastic component having the same elastic stiffness coefficients. The first elastic component and the second elastic component whose elastic stiffness coefficients are a half of an elastic stiffness coefficient of the horizontal elastic component are selected to cause a stiffness of the support apparatus for a modal test to be zero.

The stiffness of the support apparatus for a modal test is a ratio of the force to the deformation of the support apparatus when the support apparatus is used for the modal test. A smaller stiffness of the support apparatus for a modal test indicates a more accurate modal test result.

It is assumed that an elastic stiffness coefficient $K_v$ of the first elastic component is a half of an elastic stiffness coefficient $K_h$ of the horizontal elastic component. A dynamic relationship of the support apparatus is that:

It is assumed that an elastic stiffness coefficient of the horizontal elastic component is $K_h$, an elastic stiffness coefficient of the vertical first elastic component is $K_v$, a vibration isolation mass is m, and the rest mass is temporarily excluded. An x axis is forward upward, and the point where the four rhombus-shaped frame support rods overlap horizontally is x zero.

The vertical first elastic component deforms under the action of mass block gravity: $\Delta x = mg/K_v$.

Under the action of external forces, the force of the whole shear angle mechanism can be expressed as: $f(x) = f_v + mg - f_t$.

where: x represents an upward movement position of the mass block, where $$f_v = K_v(x - \Delta x), \ f_t = 2f_n \tan \alpha, \ \tan \alpha = x/\sqrt{4L^2 - x^2}.$$

$$f(x) = K_v x - 2K_h x \left( \frac{d - 2L}{\sqrt{4L^2 - x^2}} + 1 \right)$$

In conclusion, it may be represented as:

$$\text{cause } x/L, \ \beta = K_h/K_v, \ \delta = d/L \tag{1}$$

The expression (1) turns to be:

$$h(\mu) = \mu - 2\beta\mu \left( \frac{\delta - 2}{\sqrt{4 - \mu^2}} + 1 \right)$$

A zero-stiffness condition is:

$$h'(\mu) = 1 - 2\beta \left( \frac{4(\delta - 2)}{(4 - \mu^2)^{3/2}} + 1 \right) = 0$$

where x represents an original length of the first elastic component, and L represents a length of the rhombus-shaped frame support rod.

It may be known from the foregoing analysis that, when the elastic stiffness coefficient of the horizontal elastic component is twice of the elastic stiffness coefficient of the first elastic component, the stiffness of the entire support apparatus is approximately zero. Therefore, when the elastic stiffness coefficients of the first elastic component and the second elastic component are a half of the elastic stiffness coefficient of the horizontal elastic component, the stiffness of the entire support apparatus is or approximately zero.

According to an exemplary implementation, the stiffness of the support apparatus for a modal test is low, the modal test requirements of the low-frequency structure are met, and the credibility of the test is improved, and the composition is simple, reliable, the robustness is good, and easy to operate.

As a preferred solution, the anti-stiffness rhombus-shaped frame includes a first rhombus-shaped frame support rod, a second rhombus-shaped frame support rod, a third rhombus-shaped frame support rod and a fourth rhombus-shaped frame support rod that are connected successively and a first hinge, a second hinge, a third hinge, and a fourth hinge, the first rhombus-shaped frame support rod and the second rhombus-shaped frame support rod are articulated via the first hinge, the second rhombus-shaped frame support rod and the third rhombus-shaped frame support rod are articulated via the second hinge, the third rhombus-shaped frame support rod and the fourth rhombus-shaped frame support rod are articulated via the third hinge, and the fourth rhombus-shaped frame support rod and the first rhombus-shaped frame support rod are articulated via the fourth hinge.

Specifically, the anti-stiffness rhombus-shaped frame is made of 4 rhombus-shaped frame support rods which are successively hinged via 4 hinges.

As a preferred solution, the second hinge is located at a bottom of the anti-stiffness rhombus-shaped frame, and the fourth hinge is located at a top of the anti-stiffness rhombus-shaped frame.

Specifically, the second hinge is located at a bottom of the anti-stiffness rhombus-shaped frame, the fourth hinge is located at a top of the anti-stiffness rhombus-shaped frame, the first hinge is located at a right side of the anti-stiffness rhombus-shaped frame, and the third hinge is located at a left side of the anti-stiffness rhombus-shaped frame.

As a preferred solution, the horizontal elastic component is disposed between the first hinge and the third hinge.

Specifically, the first hinge and the third hinge which respectively arranged on the left and right sides are connected via the horizontal elastic component, the top of the fourth hinge is provided with a rubber head, and the bottom of the fourth hinge is fixedly connected to the slide bar.

As a preferred solution, the scalable sleeve comprises a sleeve body and a slide bar disposed in the sleeve body, one end of the slide bar is connected to a bottom of the fourth hinge, and the other end of the slide bar is disposed inside the sleeve body, and the second hinge is fixedly connected to a side wall of a lower part of the sleeve body, so that the slide bar slides in the sleeve body to deform the anti-stiffness rhombus-shaped frame.

Specifically, the second hinge is fixed at a side wall of the sleeve body, the slide bar is connected inside the sleeve body via a linear bearing, and the sleeve body is vertically mounted on the horizontal support plate. When the rhombus-shaped frame support rod of the anti-stiffness rhombus-shaped frame is adjusted, the slide bar slides in the sleeve body to deform the anti-stiffness rhombus-shaped frame.

As a preferred solution, the other end of the slide bar is connected inside the sleeve body via a linear bearing.

As a preferred solution, a rubber head is disposed at a top of the fourth hinge, and the rubber head is connected to the test unit.

Specifically, the test unit is disposed on the rubber head at the top of the fourth hinge.

As a preferred solution, the base comprises a support pillar and a horizontal support plate, the support pillar is disposed under the horizontal support plate, the horizontal support plate is connected to the support pillar and the sleeve body respectively, and the sleeve body passes through the horizontal support plate.

Specifically, the support pillar is disposed under the horizontal support plate, the horizontal support plate is provided with the sleeve body, and the sleeve body is connected to the anti-stiffness rhombus-shaped frame. The slide bar slides in the sleeve body to deform the anti-stiffness rhombus-shaped frame.

As a preferred solution, the first rhombus-shaped frame support rod, the second rhombus-shaped frame support rod, the third rhombus-shaped frame support rod, the fourth rhombus-shaped frame support rod, and the slide bar are all made of alloy materials.

Specifically, the four rhombus-shaped frame support rods and the slide bar are all made of aluminium alloy materials, and the rubber head is made of rubber with large elasticity.

The present invention further provides a method for using the foregoing support apparatus for a modal test, including: disposing a test unit on the support structure and suspending the test unit by means of the suspension structure; adjusting, after the suspended test unit is balanced and stationary, the first rhombus-shaped frame support rod, the second rhombus-shaped frame support rod, the third rhombus-shaped frame support rod, and the fourth rhombus-shaped frame support rod, to cause the first rhombus-shaped frame support rod and the second rhombus-shaped frame support rod to overlap, to cause the third rhombus-shaped frame support rod and the fourth rhombus-shaped frame support rod to overlap, and to cause the first rhombus-shaped frame support rod and third rhombus-shaped frame support rod to be at the same horizontal level.

Specifically, before using, the solar UAV is balanced and stationary under the suspension action of the two elastic components of the suspension structure, and the four rhombus-shaped frame support rods are adjusted so that the four rhombus-shaped frame support rods are horizontal and in the same horizontal line, the horizontal elastic structure is in the maximum tensile state, and the rubber head is on the structure at the center of gravity position of the solar UAV. In this form, the stiffness of the apparatus for a modal test is zero or approximately zero, and the modal test is started.

EMBODIMENT

Figure 2:
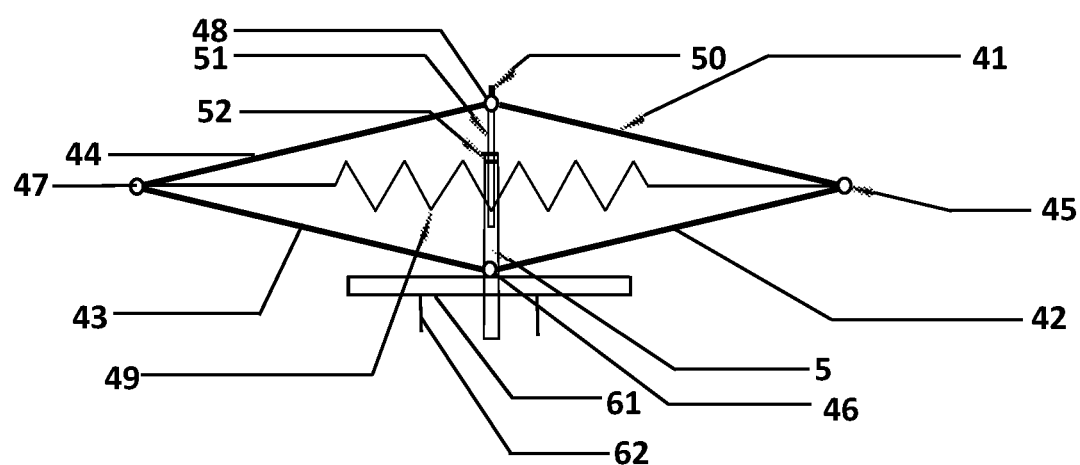
FIG. 2 is a structural schematic diagram of an anti-stiffness rhombus-shaped frame of a support apparatus for a modal test according to one embodiment of the present invention.

FIG. 1 is a structural diagram of a support apparatus for a modal test according to one embodiment of the present invention. FIG. 2 is a structural schematic diagram of an anti-stiffness rhombus-shaped frame of a support apparatus for a modal test according to one embodiment of the present invention.

With reference to FIG. 1 and FIG. 2, the support apparatus for a modal test includes: a suspension structure 1, configured to suspend a test unit 2; and a support structure, disposed under the suspension structure 1 and configured to support the test unit 2, the suspension structure 1 and the support structure being matched to cause a stiffness of the support apparatus for a modal test to be zero. The support structure includes an anti-stiffness rhombus-shaped frame 4, a scalable sleeve, a horizontal elastic component 49, and a base 6. The base 6 is disposed under the anti-stiffness rhombus-shaped frame 4, the scalable sleeve is connected to the anti-stiffness rhombus-shaped frame 4 and the base 6 respectively, and the horizontal elastic component 49 connects two diagonal points of the anti-stiffness rhombus-shaped frame 4. The suspension structure 1 includes a suspension crossbeam 3, a first elastic component, and a second elastic component. The first elastic component and the second elastic component are horizontally connected to the suspension crossbeam 3 and configured to suspend the test unit 2. The first elastic component and the second elastic component have the same elastic stiffness coefficient, and the elastic stiffness coefficients of the first elastic component and the second elastic component are a half of an elastic stiffness coefficient of the horizontal elastic component 49.

The anti-stiffness rhombus-shaped frame 4 includes a first rhombus-shaped frame support rod 41, a second rhombus-shaped frame support rod 42, a third rhombus-shaped frame support rod 43 and a fourth rhombus-shaped frame support rod 44 that are connected successively and a first hinge 45, a second hinge 46, a third hinge 47, and a fourth hinge 48, the first rhombus-shaped frame support rod 41 and the second rhombus-shaped frame support rod 42 are articulated via the first hinge 45, the second rhombus-shaped frame support rod 42 and the third rhombus-shaped frame support rod 43 are articulated via the second hinge 46, the third rhombus-shaped frame support rod 43 and the fourth rhombus-shaped frame support rod 44 are articulated via the third hinge 47, and the fourth rhombus-shaped frame support rod 44 and the first rhombus-shaped frame support rod 41 are articulated via the fourth hinge 48.

The second hinge 46 is located at a bottom of the anti-stiffness rhombus-shaped frame 4, and the fourth hinge 48 is located at a top of the anti-stiffness rhombus-shaped frame 4.

The horizontal elastic component 49 is disposed between the first hinge 45 and the third hinge 47.

The scalable sleeve includes a sleeve body 5 and a slide bar 51 disposed in the sleeve body, one end of the slide bar 51 is connected to a bottom of the fourth hinge 48, and the other end of the slide bar 51 is disposed inside the sleeve body 5, and the second hinge 46 is fixedly connected to a side wall of a lower part of the sleeve body 5, so that the slide bar 51 slides in the sleeve body 5 to deform the anti-stiffness rhombus-shaped frame 4.

The other end of the slide bar 51 is connected inside the sleeve body 5 via a linear bearing 52.

The top of the fourth hinge 48 is provided with a rubber head 50, and the rubber head 50 is connected to the test unit 2.

The base 6 includes a support pillar 62 and a horizontal support plate 61, the support pillar 62 is disposed under the horizontal support plate 61, the horizontal support plate 61 is connected to the support pillar 62 and the sleeve body 5 respectively, and the sleeve body 5 passes through the horizontal support plate 61.

The first rhombus-shaped frame support rod 41, the second rhombus-shaped frame support rod 42, the third rhombus-shaped frame support rod 43, the fourth rhombus-shaped frame support rod 44, and the slide bar 51 are all made of alloy materials.

Embodiments of the present invention have been described above and are exemplary, not exhaustive, and are not limited to the embodiments disclosed. Without deviating from the scope and spirit of the illustrated embodiments, many modifications and changes would be obvious to the persons of ordinary skills in the art.

The invention claimed is:

1. A support apparatus for a modal test, comprising a suspension structure, configured to suspend a test unit; and a support structure, disposed under the suspension structure and configured to support the test unit, the suspension structure and the support structure being matched to cause a stiffness of the support apparatus for a modal test to be zero;

the support structure comprising an anti-stiffness rhombus-shaped frame, a scalable sleeve, a horizontal elastic component, and a base, the base being disposed under the anti-stiffness rhombus-shaped frame, the scalable sleeve being connected to the anti-stiffness rhombus-shaped frame and the base respectively, and the horizontal elastic component connecting two diagonal points of the anti-stiffness rhombus-shaped frame; wherein the suspension structure comprises a suspension crossbeam, a first elastic component, and a second elastic component, the first elastic component and the second elastic component are horizontally connected to the suspension crossbeam and configured to suspend the test unit, and the first elastic component and the second elastic component have the same elastic stiffness coefficient, and the elastic stiffness coefficients of the first elastic component and the second elastic component are a half of an elastic stiffness coefficient of the horizontal elastic component;

the anti-stiffness rhombus-shaped frame comprises a first rhombus-shaped frame support rod, a second rhombus-shaped frame support rod, a third rhombus-shaped frame support rod and a fourth rhombus-shaped frame support rod that are connected successively and a first hinge, a second hinge, a third hinge, and a fourth hinge, the first rhombus-shaped frame support rod and the second rhombus-shaped frame support rod are articulated via the first hinge, the second rhombus-shaped frame support rod and the third rhombus-shaped frame support rod are articulated via the second hinge, the third rhombus-shaped frame support rod and the fourth rhombus-shaped frame support rod are articulated via the third hinge, and the fourth rhombus-shaped frame support rod and the first rhombus-shaped frame support rod are articulated via the fourth hinge.

2. The support apparatus for a modal test according to claim 1, wherein the second hinge is located at a bottom of the anti-stiffness rhombus-shaped frame, and the fourth hinge is located at a top of the anti-stiffness rhombus-shaped frame.

3. The support apparatus for a modal test according to claim 2, wherein the horizontal elastic component is disposed between the first hinge and the third hinge.

4. The support apparatus for a modal test according to claim 2, wherein the scalable sleeve comprises a sleeve body and a slide bar disposed in the sleeve body, one end of the slide bar is connected to a bottom of the fourth hinge, and the other end of the slide bar is disposed inside the sleeve body, and the second hinge is fixedly connected to a side wall of a lower part of the sleeve body, so that the slide bar slides in the sleeve body to deform the anti-stiffness rhombus-shaped frame.

5. The support apparatus for a modal test according to claim 4, wherein the other end of the slide bar is connected inside the sleeve body via a linear bearing.

6. The support apparatus for a modal test according to claim 4, wherein the base comprises a support pillar and a horizontal support plate, the support pillar is disposed under the horizontal support plate, the horizontal support plate is connected to the support pillar and the sleeve body respectively, and the sleeve body passes through the horizontal support plate.

7. The support apparatus for a modal test according to claim 4, wherein the first rhombus-shaped frame support rod, the second rhombus-shaped frame support rod, the third rhombus-shaped frame support rod, the fourth rhombus-shaped frame support rod, and the slide bar are all made of alloy materials.

8. The support apparatus for a modal test according to claim 2, wherein a rubber head is disposed at a top of the fourth hinge, and the rubber head is connected to the test unit.

9. A method for using the support apparatus for a modal test according to claim 1, comprising:
  disposing a test unit on the support structure and suspending the test unit by means of the suspension structure;
  adjusting, after the suspended test unit is balanced and stationary, the first rhombus-shaped frame support rod, the second rhombus-shaped frame support rod, the third rhombus-shaped frame support rod, and the fourth rhombus-shaped frame support rod, to cause the first rhombus-shaped frame support rod and the second rhombus-shaped frame support rod to overlap, to cause the third rhombus-shaped frame support rod and the fourth rhombus-shaped frame support rod to overlap, and to cause the first rhombus-shaped frame support rod and third rhombus-shaped frame support rod to be at the same horizontal level.

\* \* \* \* \*